US012234889B2

(12) United States Patent
Wijntjes et al.

(10) Patent No.: US 12,234,889 B2
(45) Date of Patent: Feb. 25, 2025

(54) DRIVING UNIT FOR AN ADJUSTABLE ELEMENT, METHOD FOR ADJUSTING AN ADJUSTABLE ELEMENT WITH A DRIVING UNIT, MOTOR VEHICLE PROVIDED WITH AN ADJUSTABLE ELEMENT WITH A DRIVING UNIT

(71) Applicant: MCi (Mirror Controls International) Netherlands B.V., Woerden (NL)

(72) Inventors: Jannick Daniël Wijntjes, Rotterdam (NL); Stefan Fritz Brouwer, Schoonhoven (NL); Stephen Alexander George Gustavo Boom, Zeist (NL)

(73) Assignee: MCI (MIRROR CONTROLS INTERNATIONAL) NETHERLANDS B.V., Woerden (NL)

( * ) Notice: Subject to any disclaimer, the term of this patent is extended or adjusted under 35 U.S.C. 154(b) by 0 days.

(21) Appl. No.: 18/267,857

(22) PCT Filed: Dec. 17, 2021

(86) PCT No.: PCT/NL2021/050777
§ 371 (c)(1),
(2) Date: Jun. 16, 2023

(87) PCT Pub. No.: WO2022/131923
PCT Pub. Date: Jun. 23, 2022

(65) Prior Publication Data
US 2024/0110613 A1  Apr. 4, 2024

(30) Foreign Application Priority Data

Dec. 17, 2020  (NL) .................................. 2027141

(51) Int. Cl.
*F16H 1/16* (2006.01)
*B62D 35/00* (2006.01)
(Continued)

(52) U.S. Cl.
CPC ............... *F16H 1/16* (2013.01); *B62D 35/00* (2013.01); *F16H 1/22* (2013.01); *F16H 57/039* (2013.01);
(Continued)

(58) Field of Classification Search
CPC . F16H 1/16; F16H 1/22; F16H 57/039; F16H 2057/02034; F16H 2057/02082; B62D 35/00
See application file for complete search history.

(56) References Cited

U.S. PATENT DOCUMENTS 6,223,615 B1 * 5/2001 Huck .................... H02K 7/1166
74/427
7,322,257 B2 * 1/2008 Becker ............... B60N 2/02246
74/409

(Continued)

FOREIGN PATENT DOCUMENTS

EP  0603453 A1  6/1994
EP  0617213 A1  9/1994
(Continued)

*Primary Examiner* — Terence Boes
(74) *Attorney, Agent, or Firm* — Volpe Koenig

(57) ABSTRACT

Drive unit for adjusting an adjustable element between at least a first position and a second position, comprising a drive train having an input shaft and an output shaft, wherein the drive train is split into at least a first drive path and a second drive path, wherein at least one drive element in the drive train comprises an evoloid toothing.

19 Claims, 5 Drawing Sheets

Figure 1A:
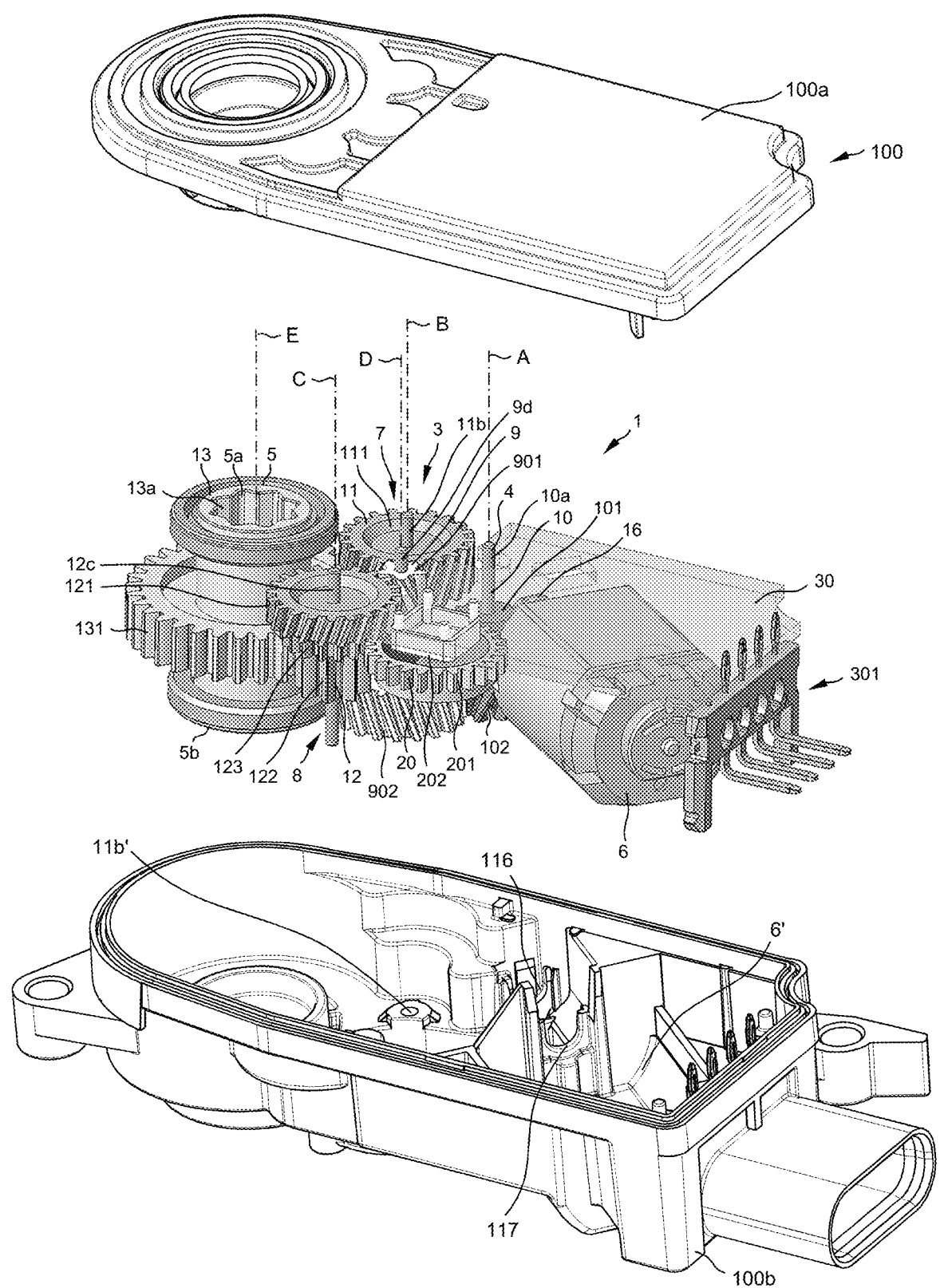

(51) Int. Cl.
  *F16H 1/22*      (2006.01)
  *F16H 57/02*     (2012.01)
  *F16H 57/039*    (2012.01)

(52) U.S. Cl.
  CPC ............. *F16H 2057/02034* (2013.01); *F16H 2057/02082* (2013.01)

(56) References Cited

U.S. PATENT DOCUMENTS

| | | | |
|---|---|---|---|
| 9,163,700 B2 * | 10/2015 | Schneider | ............... H02K 1/278 |
| 2016/0121336 A1 | 5/2016 | Yalin et al. | |
| 2021/0010572 A1 * | 1/2021 | Djedovic | ................. H02K 5/08 |

FOREIGN PATENT DOCUMENTS

| | | | |
|---|---|---|---|
| EP | 3565093 A1 | 11/2019 |
| WO | 2019241922 A1 | 12/2019 |

* cited by examiner

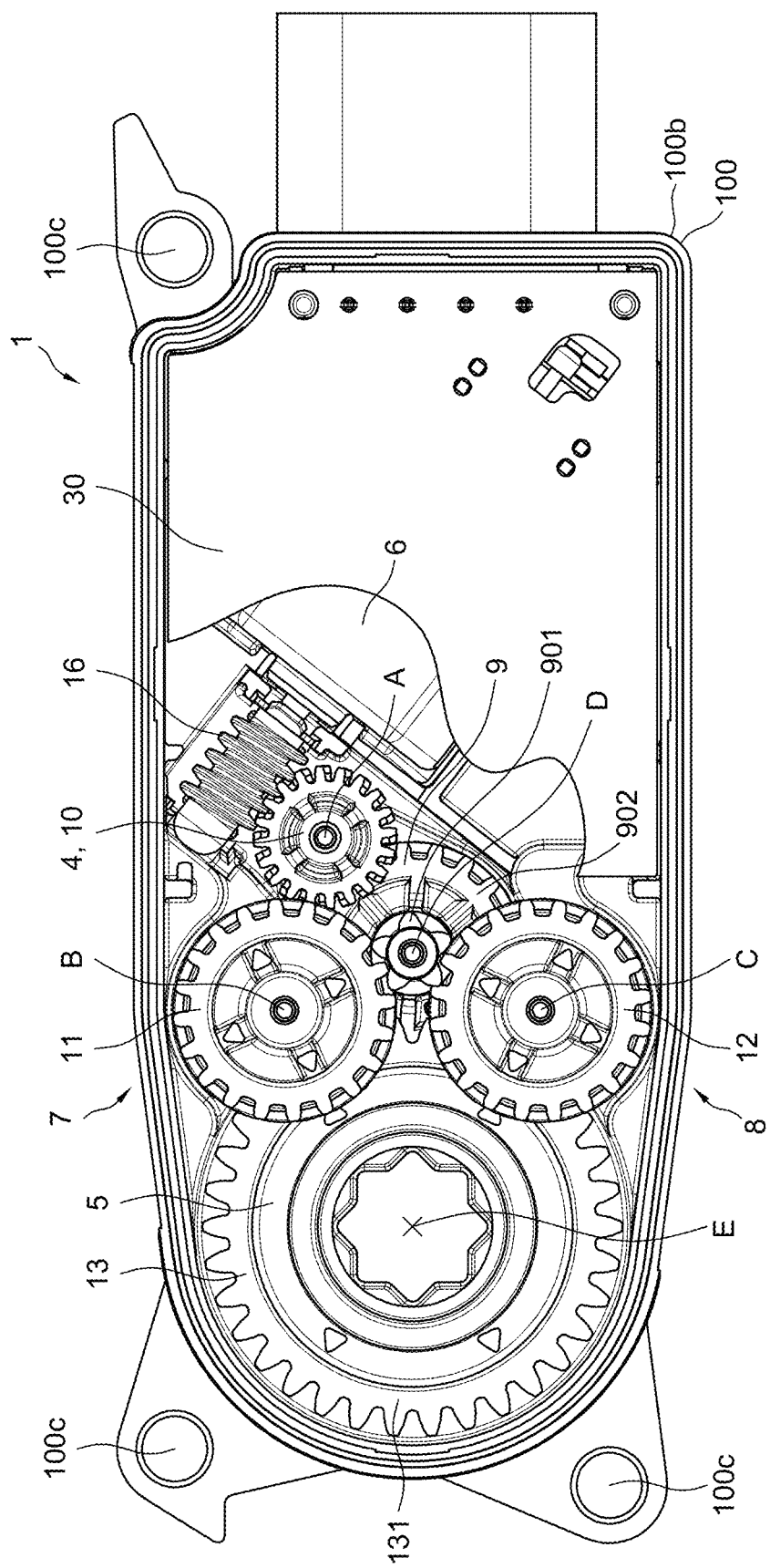
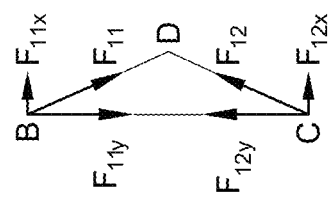
Fig. 2
Fig. 2a

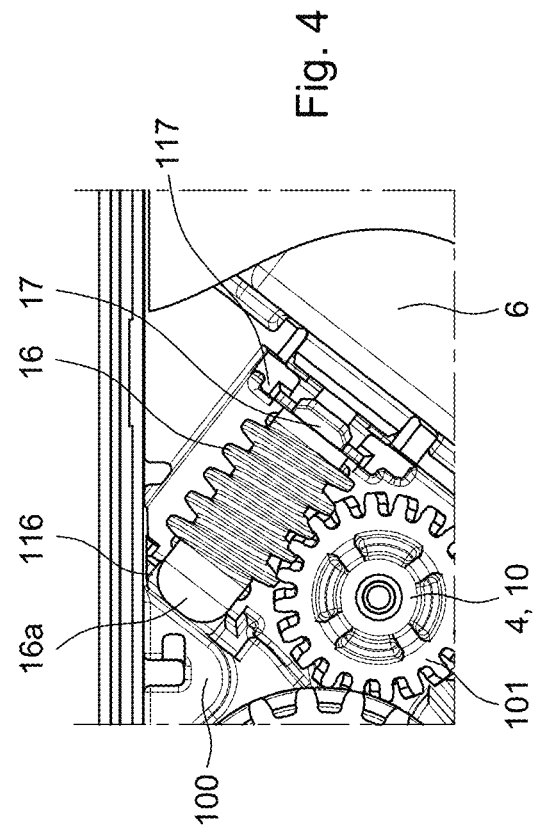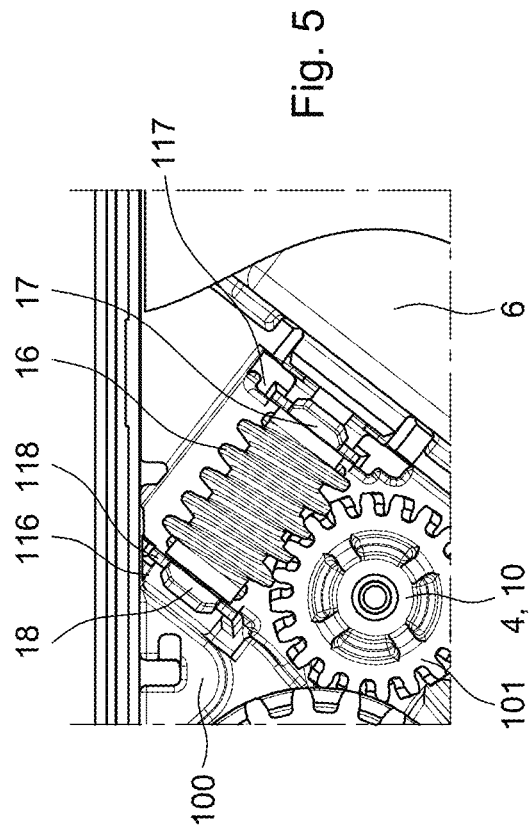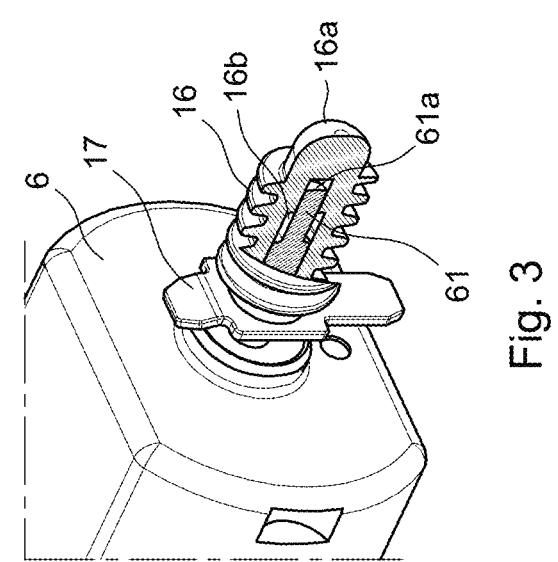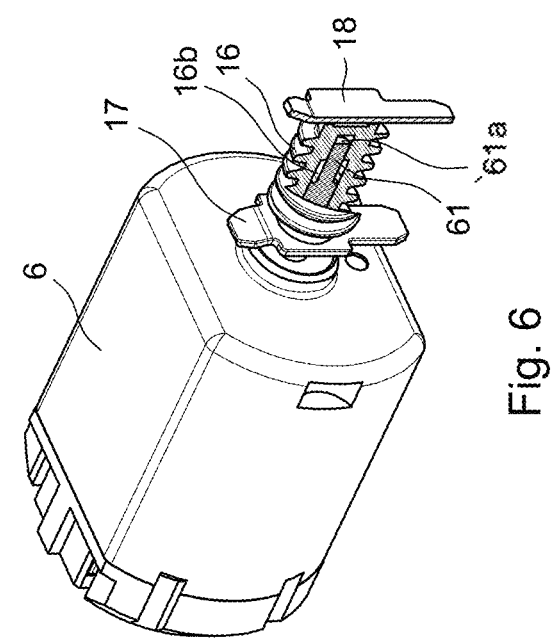

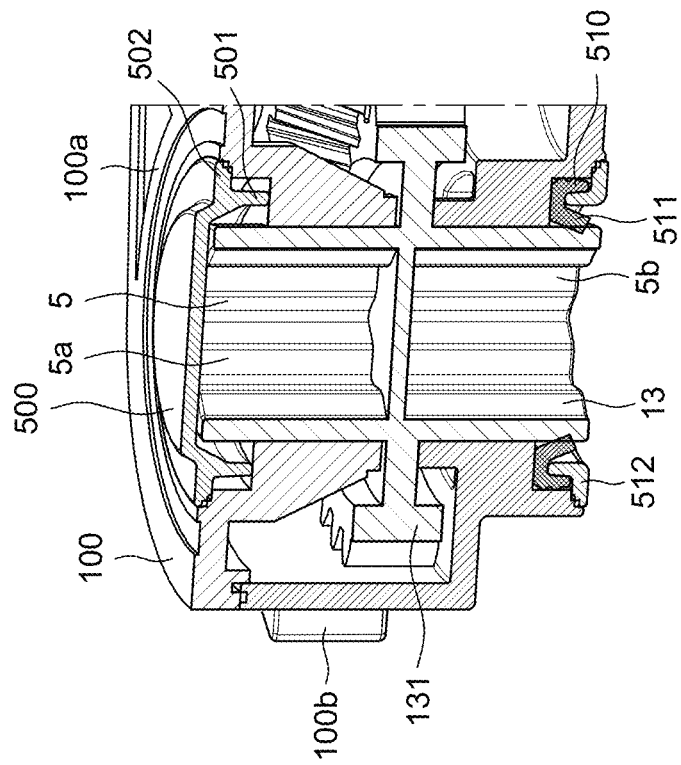
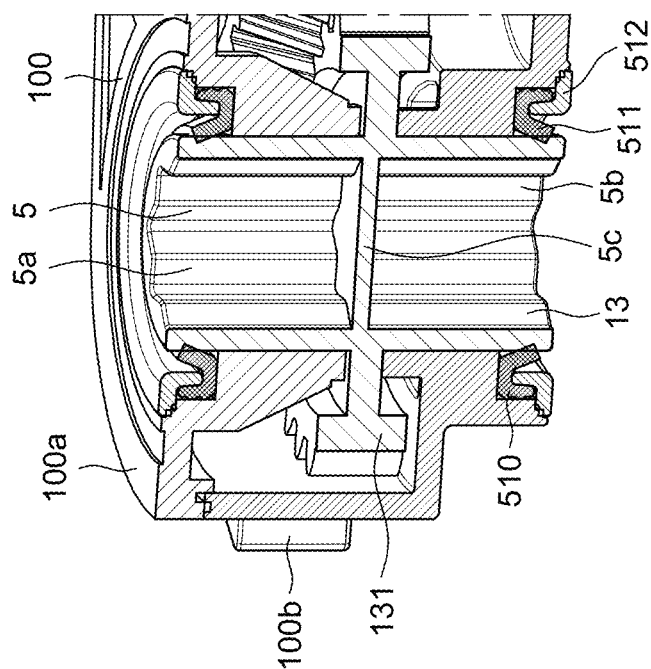
Fig. 8
Fig. 7

DRIVING UNIT FOR AN ADJUSTABLE ELEMENT, METHOD FOR ADJUSTING AN ADJUSTABLE ELEMENT WITH A DRIVING UNIT, MOTOR VEHICLE PROVIDED WITH AN ADJUSTABLE ELEMENT WITH A DRIVING UNIT

CROSS REFERENCE TO RELATED APPLICATIONS

This application is a 35 USC § 371 National Stage application of International Patent Application No. PCT/NL2021/050777, which was filed Dec. 17, 2021, entitled "DRIVING UNIT FOR AN ADJUSTABLE ELEMENT, METHOD FOR ADJUSTING AN ADJUSTABLE ELEMENT WITH A DRIVING UNIT, MOTOR VEHICLE PROVIDED WITH AN ADJUSTABLE ELEMENT WITH A DRIVING UNIT" and claims priority to Netherlands Patent Application No. 2027141, filed Dec. 17, 2020, which are incorporated herein by reference as if fully set forth.

The invention relates to a drive unit for adjusting an adjustable element, such as an air stream influencing element of a motor vehicle.

A motor vehicle, but also other devices, such as satellite receivers, are provided with multiple adjustable elements, such as for instance a mirror adjusting element, a shutoff element or locking element for the energy supply, or an air stream influencing element. Such adjustable elements are provided with a drive unit which is configured for adjusting the adjustable element, such as a mirror or a front wheel flap or a spoiler, or components of the adjustable element, such as strips of an air inlet.

An air stream influencing element can be, for example, a shutter of an air inlet of a motor vehicle, in particular adjustable strips or flaps of the air inlet. An air stream influencing element can be, for example, a wing which is situated at an outer side of a motor vehicle, or an air dam or spoiler which is situated at an underside of a motor vehicle. An air stream influencing element can also be a front wheel flap or a rear wheel flap. The air stream influencing elements, also called air guiding elements, guide or manipulate an air stream in and/or around a vehicle. Such an air stream influencing element can be designed to be adjustable, for instance between a first position and a second position. The first position and the second position can respectively be an open position and a closed position, but may also be an in-position and an out-position.

Also a mirror adjusting element may be provided with a drive unit for adjusting a mirror glass, of for instance an interior mirror unit or an exterior mirror unit of a motor vehicle. The mirror glass may be adjustable into a random number of positions.

With motor vehicles, also the closing element for the petrol filling opening and/or plug opening may be designed to be automatically adjustable with the aid of a drive unit. In particular with electrically chargeable vehicles, furthermore, provision can be made for an adjusting element for locking a charging plug when arranged in the plug opening, so that the charging plug cannot be erroneously removed again before charging has been ended. Such an adjusting element is then adjustable between an out-position in which it blocks the charging plug and an in-position in which it releases the charging plug.

In satellite receivers, the receiving element may be designed to be adjustable with the aid of a drive unit. In particular, satellite receivers which are directed to non-geostationary satellites, or receivers alternately directed to different satellites, may be provided with an electrically adjustable receiving element. Such a receiving element is then adjustable about at least one but preferably several adjustment axes, for instance an axis passing through the centre of the earth, or an axis parallel to a tangent line to the surface of the earth.

The adjusting elements, and in particular the drive units for the adjusting elements which are accommodated in the motor vehicle, or the adjusting elements for a satellite signal receiver, often have to be accommodated there where available space is limited. Therefore, there is also an ongoing search for compact drive units for such drive units for such adjusting elements.

An object of this disclosure is therefore to provide a drive unit that is relatively compact.

To this end, this disclosure provides a drive unit for adjusting an adjustable element according to claim 1.

By providing a drive unit having a split drive train, the power flow from the input shaft to the output shaft can be halved over the first drive path and over the second drive path. In consequence of this, in the first drive path and in the second drive path, use can be made of smaller drive elements. The smaller drive elements can take up less space than a drive element in an unsplit drive train could. Also, by providing a split drive train, there can be less play in the drive train. Optionally, the drive train can even be implemented to be free of play. Optionally, the drive elements in the first drive path and/or in the second drive path can be made lighter and/or of a cheaper material. Owing to the split drive train, the drive elements per drive path can not only become smaller, but can also be more favorably, and hence more compactly, accommodated in the drive unit.

By, in addition, also implementing at least one element in the drive train with an evoloid toothing, the drive train can be implemented yet more compactly. For via an evoloid toothing, with a limited number of teeth a relative large force transmission can be achieved. By use of an evoloid drive element in the drive train, the drive train can be of simple and inexpensive design. Also, a high efficiency can be achieved, in consequence of which the drive unit can be easily employed for diverse applications, for instance also for air influencing elements, which require a relatively high adjusting force.

Advantageously, the drive train may further be split once again into at least two drive paths. In that case, for instance, the first drive path and the second drive path can meet at a drive element, and, for instance in the drive train, the drive train may be split anew into at least two drive paths. In that manner, also in a longer drive train, the advantage of splitting the drive train can be achieved. Optionally, even a split transmission may be provided between the motor and the input shaft of the drive train.

Advantageously, the drive element with the evoloid toothing is between the first drive path and the second drive path. Preferably, the drive element with evoloid toothing is at a split between the first drive path and the second drive path, as splitting drive element. Thus, the drive element with evoloid toothing is a splitting drive element after which the drive train splits into at least a first drive path and a second drive path. In that way, with a relatively compact drive element with evoloid toothing, the input force can be split to the first drive path and to the second drive path. The splitting drive element may advantageously be implemented as the drive element with evoloid toothing, but may alternatively be implemented without evoloid toothing.

Advantageously, the drive element with evoloid toothing is a pinion with evoloid toothing. A pinion with evoloid toothing can be of very compact and small design, in consequence of which it takes up little space in the drive train. The pinion with evoloid toothing can transmit relatively large forces in the drive train in an efficient and compact manner.

A pinion with evoloid toothing is understood to mean in this disclosure a pinion with a toothing, where
the number of teeth is smaller than or equal to 6;
the tooth angle is greater than 15°;
the profile correction of the pinion is greater than 0.5;
the profile correction of the main drive element is less than or equal to 0;
the dedendum factor of the main drive element is greater than or equal to the addendum factor of the pinion; and
the addendum factor of the main drive element is substantially equal to the dedendum factor of the pinion.

Such an evoloid toothing is discussed by K. Roth in Zahnrad Technik—Evolventen Sonderverzahnungen, Springer Verlag, ISBN 3-540-64236-6.

When the pinion is implemented with an evoloid toothing, usually also the drive element coupled therewith, for example a gear, is implemented with an evoloid toothing. Thus, optimum use can be made of the efficient force transmission with the evoloid toothing.

The first drive path has at least one first drive element, and the second drive path has at least one second drive element, wherein the at least one first drive element and the at least one second drive element are both in engagement with the drive element with evoloid toothing as splitting drive element. Thus, in an efficient and compact manner, the force transmission can take place in the drive train between the input shaft and the output shaft of the drive train. The first drive element which is in engagement with the splitting drive element is also implemented with an evoloid toothing, preferably implemented as a gear with evoloid toothing. The second drive element which is in engagement with the splitting drive element is also implemented with an evoloid toothing, preferably implemented as a gear with evoloid toothing.

The at least one first drive element and the at least one second drive element can also be both in engagement with the output shaft for jointly driving the output shaft. Thus, the first drive path and the second drive path come together again at the output shaft. The first drive path can thus comprise a single first drive element which on the one hand is in engagement with the splitting drive element and on the other hand with the output shaft. The second drive path can thus comprise a single second drive element which on the one hand is in engagement with the splitting drive element and on the other hand with the output shaft. Because the first drive element on the one hand is in engagement with the drive element with the evoloid toothing and on the other hand is in engagement with the output shaft, the first drive path comprises only the first drive element, the first drive path thereby being compactly implemented. Also, the second drive path in a comparable manner comprises only the second drive element which on the one hand is in engagement with the drive element with the evoloid toothing and on the other hand is in engagement with the output shaft. Alternatively, the first drive path can comprise two or more drive elements, and also the second drive path can comprise two or more drive elements, depending on the available space and/or the desired transmission ratio.

For instance, the first drive element, which is in engagement with the splitting drive element, can be around a first axis, the second drive element, which is in engagement with the splitting drive element, is around a second axis, and the drive element with the evoloid toothing, as splitting drive element, is around a third axis, to achieve a compact setup in this manner. Preferably, the first axis, the second axis and the third axis are substantially parallel with each other and at a distance from each other. The axes can also be rotation axes around which the drive elements are rotatably received. Thus, the drive elements can be in lying orientation in the drive unit, in consequence of which the drive unit can be implemented with a small height, measured in the direction of the axes. Optionally, the first axis, the second axis and the third axis can extend in a direction equal to a direction of the output shaft, in consequence of which the output shaft element can also be received in lying orientation in the drive unit, and the height of the drive unit can remain limited. Because of this, the drive unit can be of relatively flat construction, thereby being receivable in cavities in a vehicle or device with a limited overall depth.

The first axis, the second axis and the third axis may be so positioned relative to each other that they, viewed in a direction along the axes, form an isosceles triangle. A leg of the triangle between the first axis and the third axis is then practically as long as a leg of the triangle between the second axis and the third axis. In practice, it may be that due to building-in and/or manufacturing tolerances, the distances between the first axis and the third axis and between the second axis and the third axis are not exactly the same. The skilled person appreciates that in that case such a configuration is still achieved. A symmetrical configuration can thereby be obtained, which is favorable for the force transmission in the drive train and, in particular, for splitting the force in two as well as possible to the first drive path and to the second drive path. Advantageously, through each drive path passes one half of the force of the drive train, then coming together at the output shaft. By positioning the first axis, the second axis and the third axis in a symmetrical configuration, viz. an isosceles triangle, a force distribution as balanced as possible can be achieved.

The triangle configuration of the first axis, the second axis and the third axis is preferably an obtuse triangle configuration, with the angle at the third axis being the obtuse angle. This means that the angle between a leg of the triangle from the first axis to the third axis, and a leg of the triangle from the second axis to the third axis, is an obtuse angle. An obtuse angle is greater than 90 degrees, preferably the obtuse angle is here between about 150 degrees and about 180 degrees, preferably the obtuse angle is 150 degrees or more, and less than 180 degrees. Thus a fairly flat triangle can be obtained, while the drive element around the third axis is relatively close to the leg of the triangle between the first axis and the second axis. Thus, the radial forces of the first drive element and the second drive element, which are in a same line of force, can largely cancel each other out, and only a small force component can be left in the direction transverse to the line of force mentioned. This small force component can be absorbed by the drive element with the evoloid toothing. In an example, the drive element with the evoloid toothing is itself in engagement with the drive element of the input shaft. In that case, even the remaining small force component on the drive element with the evoloid toothing can at least partly be compensated by the force exerted by the drive element of the input shaft, which means the drive element with the evoloid toothing can be made of relatively light and relatively small construction.

It is still more advantageous when the first axis, the second axis and the third axis form an angle of 180 degrees with each other, viewed in the direction along the axes, that is, when they are in one plane. In this optimal situation, the force on the drive element with evoloid toothing, under the influence of the first drive element, and the second drive element, is practically zero. The small forces on the drive element with evoloid toothing are advantageous to the life span of the drive element concerned.

The drive element of the input shaft can be around a fourth axis, with the fourth axis being at a distance from and substantially parallel with the first axis, the second axis and the third axis. The drive element of the input shaft is advantageously set up rotatably around the fourth axis, with the fourth axis being the rotation axis of the drive element of the input shaft. Thus, the drive element of the input shaft also can be in a lying orientation in the drive unit, which enables a drive unit construction limited in height. In an example, the drive element of the input shaft can also at the same time be the splitting drive element, in consequence of which the fourth axis and the third axis coincide. In that case, the splitting drive element also functions as input shaft of the drive train.

The input shaft is driven by a motor of the drive unit, for example a brushless DC motor, or a DC motor with brush. The motor is preferably at an angle relative to the drive elements of the drive train, more specifically the motor may be oriented lying, with an output shaft pin of the motor transverse to a rotation axis of the input shaft of the drive train.

The motor has an output shaft comprising a motor worm which is in engagement with the drive element of the input shaft to thereby drive the input shaft and thus set the rest of the drive train in motion.

The motor worm of the motor is advantageously a plastic motor worm, in consequence of which it can be simply and inexpensively implemented. The motor worm may be axially bearing-mounted in a housing of the drive unit, while the motor worm is axially movable relative to the output shaft of the motor. Because the motor worm is axially movable, the axial forces of the motor worm are uncoupled from the drive train and from the motor. As a result, the motor experiences less load, and the motor is primarily rotation-loaded, in consequence of which the motor can have a longer life span.

By, in addition, rotation-locking the motor worm with the output shaft of the motor, merely torque is transmitted to the motor worm, and the motor is axially uncoupled from the drive train. For instance, the output shaft of the motor at an end thereof may be flattened, which flattened part fits into a corresponding chamber in the motor worm, thereby allowing the rotation-locking to come about. This can also improve heat dissipation from the motor worm. For, during use, the motor worm gets hot, and such heat may thus by way of the bearing of the motor worm in the housing be dissipated to the housing, which is beneficial to the life span and durability of the motor worm. Also, the motor itself thereby experiences no or less heat development from the motor worm, which is also beneficial to the life span of the motor.

In an example, the motor worm may at at least one end be axially bearing-mounted on a bearing plate, with the bearing plate being borne by the housing of the drive unit. The bearing plate is preferably a metal bearing plate, which promotes heat dissipation of the motor worm. For instance, an end of the motor worm comes against the bearing plate and is thus bearing-supported on the bearing plate. Also, provision of a bearing plate can counteract the bearing of the motor worm in the housing being corroded with the passage of time. The bearing plate can contribute to a strengthening of the bearing of the motor worm in the housing. In particular, a metal bearing plate can take care of a durable bearing of the motor worm in the housing. The plastic motor worm may thus be supported on the metal bearing plate and move over the metal bearing plate, thus to be bearing-supported on the metal bearing plate. Advantageously, both sides of the motor worm may be supported in axial direction by a bearing plate, for instance by a metal bearing plate. This can then lead to a still better heat dissipation. Also, providing a bearing plate is a compact way of implementing the axial bearing and supporting of the motor worm.

The drive unit can furthermore comprise a counting element in the drive train, for determining the position of a drive element in the drive train. By determining the position of a drive element in the drive train, in an indirect way the position of the output shaft can be determined, and hence also the position of the air influencing element. The counting element may be provided on a random element of the drive train, or can also be absent.

The drive train between the input shaft and the output shaft can furthermore comprise a next split part, in which the drive train is split into at least two drive paths. For instance, the drive train, after a first splitting drive element, which may or may not be implemented as the drive element with evoloid toothing, can comprise a first split part, which split part in turn can come together again at a drive element. Further on in the drive train, the drive train can then, for instance, comprise a next split part, which second split part can come together again at a drive element, or for instance the output shaft.

The drive unit may furthermore comprise a housing which comprises for instance two shell parts. In the housing, the shafts of the drive elements may be bearing-mounted, and also the motor worm and/or the bearing plates for the bearing of the motor worm may be bearing-mounted and/or supported by the housing. Advantageously, the motor is received in lying orientation in the housing, in consequence of which the housing also can be configured to be relatively limited in height.

The output shaft element may be provided with two opposite ends in which a coupling element is receivable for coupling with an adjusting element. Two coupling elements can be fitted in both ends for simultaneously driving two neighbouring adjusting elements. Instead of two coupling elements, also one continuous coupling element may be provided. The end of the output shaft element, which is accessible to a coupling element, may, through a plastic, preferably rubber, collar, be sealable with the housing. Preferably, the plastic collar is secured to the housing through a plastic ring which is welded to the housing. The plastic collar thus takes care of the sealing between the end of the output shaft element and the housing and itself is fixed through a plastic ring with the housing. The plastic collar is preferably a ring-shaped collar so that it can take care of sealing around the entire circumference of the output shaft element. If both ends of the output shaft element are to remain accessible for receiving a coupling element, both ends may be closed off with such a plastic collar. If only one end must remain accessible, the other end may well be closed off to keep out dirt and other ambient influences. The end of the output shaft element to be closed may then be closed with a cover, preferably a plastic cover which can be fixedly welded with the housing and can thus close off the end of the output shaft element substantially hermetically.

Closing and/or sealing an end of the output shaft element can also be considered an invention in itself, independently of the implementation of the drive train of the drive unit. The adjusting element can be an air stream influencing element of a motor vehicle. The air stream influencing element can be a wing, a flap or an air dam, or other element, and may for instance be adjusted between a first position in which it extends substantially along the vehicle and a second position in which it extends at an angle from the vehicle, or between a first position in which it extends relatively far from a side of the vehicle, and a second position in which it extends relatively less far from the side of the vehicle.

The disclosure further relates to an air stream influencing element with such a drive unit, and also to a motor vehicle with such a drive unit.

The invention relates to an air stream influencing element, such as a shutter of an air inlet or a spoiler, for instance an air dam or a wing, provided with such a drive unit, to a motor vehicle provided with such an air stream influencing element, and to a method for adjusting an air stream influencing element.

Another aspect of the invention can be to implement the motor worm of the motor of the drive unit in plastic and/or to bearing-mount it axially in the housing of the drive unit. A drive unit may be provided for adjusting an adjustable element between at least a first position and a second position, comprising a drive unit for adjusting the adjustable element between at least the first position and the second position, provided with a motor driven drive train having an input shaft and an output shaft, wherein the input shaft comprises an input drive element which is in engagement with a motor worm of the motor of the drive unit, wherein the motor worm is a plastic motor worm which is axially bearing-mounted in a housing of the drive unit and is axially movable relative to an output shaft of the motor. Such a drive unit can be favorable for a mirror adjusting device of an interior or exterior mirror of a motor vehicle. The plastic motor worm and/or the bearing thereof in the housing of the drive unit can each be considered an invention in itself, independently of the, split or non-split, implementation of the drive train of the drive unit.

Further advantageous embodiments are represented in the dependent claims.

Figure 1B:
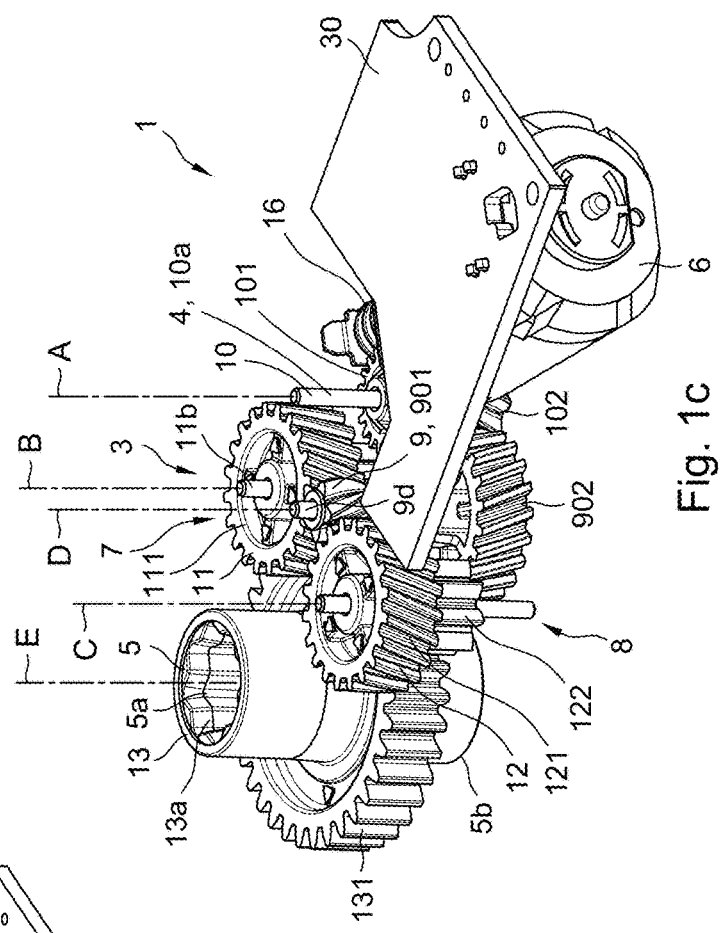
Figure 1C:
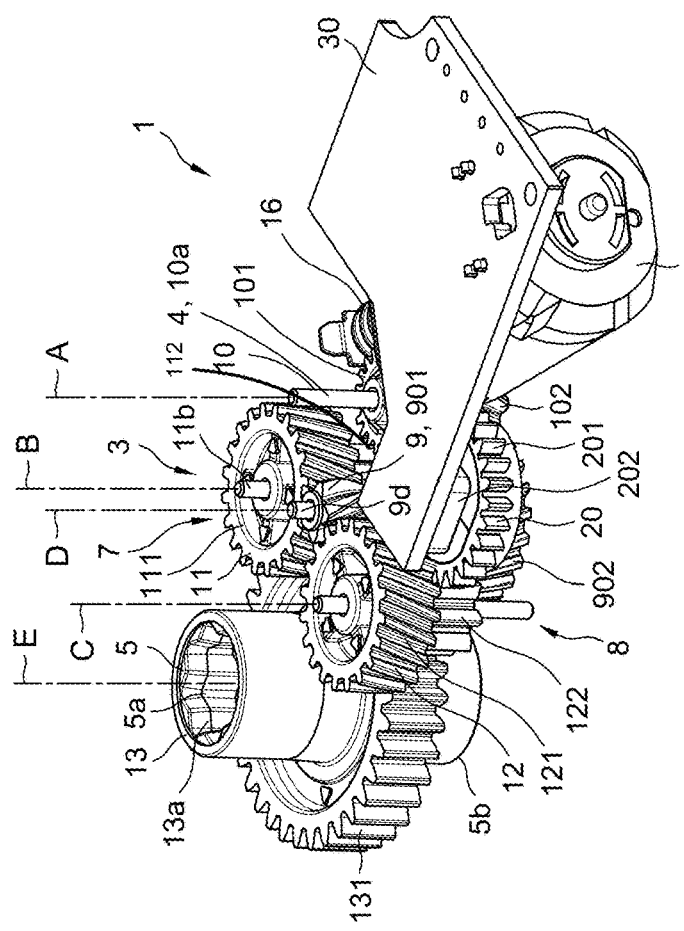

The invention will be further explained on the basis of an exemplary embodiment which is represented in a drawing. The drawing shows in the figures:

FIG. 1a a schematic perspective view of a drive unit;

FIG. 1b a schematic perspective view of an alternative embodiment of the drive unit;

FIG. 1c a schematic perspective view of an alternative embodiment of the drive unit;

FIG. 2 a top plan view of a drive unit;

FIG. 2a a diagram of forces of the split drive train;

FIG. 3 a schematic perspective view of a motor worm on the output shaft of the motor as a drive source of the drive unit;

FIG. 4 a top plan view of a bearing of the motor worm in the housing;

FIG. 5 a top plan view of an alternative bearing of the motor worm in the housing;

FIG. 6 a schematic perspective view of a motor worm on the output shaft of the motor as a drive source of the drive unit;

FIG. 7 a cross section through the output shaft of the drive unit;

FIG. 8 a cross section through the output shaft of the drive unit, where the output shaft on one side is couplable with an air stream influencing element.

It is noted that the figures are only schematic representations of exemplary embodiments of the invention. Like parts are indicated with like reference numerals.

FIG. 1a shows a schematic perspective view of a drive unit 1. The drive unit 1 is usually received in a housing 100 comprising two shell parts 100a, 100b which are attachable to each other so as to form the housing 100 closed around the drive unit 1. The shell parts 100a, 100b are represented schematically. The drive unit 1 may be configured for adjusting an air stream influencing element or a mirror adjusting element of a motor vehicle, such as a car or a truck. The adjusting element, not shown, is adjustable between at least a first position and a second position, and can optionally also be adjustable between intermediate positions.

The drive unit 1 comprises a drive train 3 with an input shaft 4 and an output shaft 5. The output shaft 5 can be coupled with the air influencing element or with adjusting elements of the air influencing element, for instance with the adjusting element directly, such as a flap, or for instance with a coupling element which couples several air influencing elements, such as strips. Thus, the drive unit 1 can adjust one or more adjusting elements of the air influencing element. The output shaft 5 may at two ends 5a, 5b be couplable with an air influencing element.

The input shaft 4 is drivable by a drive source 6, here an electric motor 6, such as for instance a brushless DC motor, or a DC motor with brush.

The motor 6 drives the input shaft 4, and thus sets the drive train 3 in motion. The drive train 3 is split into a first drive path 7 and a second drive path 8. By splitting the drive train 3, the forces can be halved between the first drive path 7 and the second drive path 8, in consequence of which the drive elements of the drive paths 7 and 8 can be of lighter and/or smaller construction, in consequence of which, in turn, the drive train, and hence the drive unit, can be of more compact construction.

The drive train 3 comprises drive elements, such as gears, worm wheels etc. which are rotatably set up. At least one drive element in the drive train 3 is provided with evoloid toothing. The drive train 3 is split at the splitting drive element 9 which is between the first drive path 7 and the second drive path 8. The splitting drive element 9 is provided with the evoloid toothing. In this example, the splitting drive element 9 has an evoloid toothing of five teeth, but may also be implemented with six teeth or with four or three teeth or two teeth, or even with one single tooth. The splitting drive element 9 is here a pinion with an evoloid toothing.

The splitting drive element 9 is in engagement with the input shaft drive element 10, which is around an input axis A. The first drive path 7 comprises a first drive element 11 and the second drive path 8 a second drive element 12. The first drive element 11 is rotatably set up around a first axis B and the second drive element 12 is rotatably set up around a second axis C. The evoloid pinion splitting drive element 9 is rotatably set up around a third axis D. The output shaft 5 comprises an output shaft element 13 which is set up rotatably around an output axis E. The first drive element 11 and the second drive element 12 are both in engagement with the output shaft element 13 of the output shaft 5 for driving of the output shaft 5. At least the first axis B, second axis C and third axis D are oriented parallel and at a distance from each other. The first, second and third axes B, C, D extend in standing direction, typically in a direction transverse to the housing. Thus, the first drive element 11, the second drive element 12 and the third drive element 13, which are rotatably set up around the first axis B, the second axis C and the third axis D, respectively, are positioned in lying orientation. Thus, the drive unit can be of compact design, and in particular be limited in height. The input axis A and/or the output axis E can optionally also be designed to be parallel with the first, second and third axes B, C, D. By also designing the output axis E to be parallel with the other axes B, C, D, the output shaft element 13 can be provided with two opposite outputs, on both sides of the housing 100, which form a first end 5a of the output shaft 5 and a second end 5b of the output shaft 5. Thus, two, neighbouring, adjusting elements can be driven by a same drive unit 1, with one continuous shaft element or two short shaft elements received in the output shaft 5. The drive elements are rotatably set up around the axes, and are rotatably mounted on shaft elements. A longitudinal axis of the shaft elements coincides with the respective axes A, B, C, D, E. The input shaft drive element 10 is mounted on the shaft element 10a, the splitting drive element 9 is mounted on the shaft element 9d, the first drive element 11 is mounted on the shaft element 11b, the second drive element 12 is mounted on the shaft element 12c. The shaft elements 9d, 10a, 11b and 12c are implemented as plastic or metal rods which are bearing-mounted in the housing 100, an end of the rods 9d, 10a, 11b and 12c is bearing-mounted in a shell part 100a, and an opposite end of the rods 9d, 10a, 11b and 12c is bearing-mounted in the other shell part 100b. Thus, in FIG. 1a, for instance, a recess 11b' can be seen in shell part 100b, in which an end of the shaft element 11b is receivable.

The drive source 6 is here disposed in lying orientation and placed obliquely in the housing 100, for instance in a receiving space 6' in shell part 100b, so as to be receivable in the housing 100 in a space saving manner. The output shaft of the motor 6 is transverse to the direction of the axis A of the input shaft 4. More particularly, the output shaft of the motor 6 is at an angle of 90 degrees to the axis A of the input shaft 4. The output shaft of the motor 6 is coupled with a motor worm 16, which motor worm 16 is in engagement with the input shaft drive element 10. The input shaft drive element 10 is provided with a first gear 101, which gear 101 is in engagement with the motor worm 16. Via the motor worm 16 the direction of rotation of the output shaft of the motor 6 can be rotated by 90 degrees to a direction of rotation around the axis A of the input shaft 4. In consequence of this, the drive unit 1 can be set up compactly, with a lying motor 6, and a drive train of which at least the input shaft 4 rotates around an axis A transverse to the output shaft of the motor 6. In this exemplary embodiment, the input shaft drive element 10 which forms the input shaft 4 is separate from the splitting drive element 9. In an alternative configuration, the splitting drive element 9 can be directly coupled with the output shaft of the motor 6 and thus form the input shaft 4.

The input shaft drive element 10 is furthermore provided with a second gear 102 coupled with the first input gear 101 so that when the first input gear 101 is driven by the motor worm 16, the second input gear 102 also rotates along around the axis A. The first input gear 101 here has an oblique toothing, but may also be implemented with a straight toothing. The second input gear 102 is here provided with evoloid toothing, but may also be implemented with a straight toothing or with a different type toothing. This second input gear 102 is in engagement with the splitting drive element 9. The splitting drive element 9 comprises a first splitting element, the pinion 901, and a second splitting gear 902. The second splitting gear 902 is in engagement with the second input gear 102, and is also provided with an evoloid toothing to be able to be in engagement with the evoloid toothing of the second input gear 102. It will be understood that when the second input gear 102 is implemented with a different toothing, the second splitting gear 902 will have a corresponding, cooperating toothing. The first splitting element 901 is the pinion with evoloid toothing which takes care of the splitting of the drive train 3 into the first drive path 7 and the second drive path 8. The pinion 901 is in engagement with the first drive element 11 and with the second drive element 12. The first drive element 11 comprises a first drive gear 111 which is in engagement with the pinion 901, and is hence provided with an evoloid toothing. The first drive element 11 comprises also a second drive gear 112, which is provided with straight toothing. The second drive element 12 comprises also a first drive gear 121 and a second drive gear 122. The first drive gear 121 is in engagement with the pinion 901, therefore provided with evoloid toothing. The second drive gear 122 is coupled with the first drive gear 121 and rotates at the same rotational speed.

The first drive element 11 and the second drive element 12 may be implemented the same, so that the first drive path 7 is symmetrical with the second drive path 8. The second drive element 12, however, may also be implemented differently from the first drive element 11, as shown in the example of FIG. 1. In the example of FIG. 1, the second drive element 12 is provided with a third drive gear 123, which is drive-coupled with a counting element 20. The counting element 20 comprises a counting gear 201 which is provided with a counting sensor 202. The counting sensor 202 may for instance be a hall sensor, or can be a visual counting sensor, or be implemented otherwise. The counting sensor 202 is connected with a printed circuit board 30 of the drive unit 1, which can for instance comprise a memory unit to monitor the position of the counting gear 201. By determining the position of the counting gear 201, indirectly the position of the output shaft 5 can be determined, and hence, indirectly, the position of the air stream influencing element. The printed circuit board 30 is provided with contact elements 301, here in the form of contact pins 301, to which a plug can be connected to provide electrical and/or data connection with a control system of the motor vehicle.

FIG. 1b shows an embodiment of the drive unit 1 in which the counting element 20 is coupled with the first drive gear 121 of the second drive element 12. A third drive gear 123 has been left out here, and the counting gear 201 is directly in engagement with the first drive gear 121. It goes without saying that the counting gear 201 can also be directly in engagement with the second drive gear 122 of the second drive element 12. In FIG. 1c an embodiment of the drive unit 1 is shown, without counting element 20. To determine the position of the output shaft, for instance use can be made of, for instance, current measurement, or, for instance, ripple counting. Such methods are also applicable in the embodiment of FIG. 1a and FIG. 1b to be able to perform an even more accurate determination of the position of the output shaft. When a counting element 20 having a counting gear 201 is provided, optionally, between the counting gear 201 and the coupled first or second drive gear 121, 122 of the second drive element 12, an additional gear may be provided to furnish a desired delay stage. In this way, the counting element 20 can read out the position of the counting gear 201 more accurately, and thus determine the position of the output shaft element 13 more accurately.

The output shaft element 13 comprises an output gear 131 which is at the same time in engagement with both the second drive gear 112 of the first drive element 11 and with the second drive gear 122 of the second drive element 12 of the split drive train 3. The split drive train 3 thus comes together again at the output shaft element 13.

In use, the motor 6 can receive a signal, from for instance a central control system, to adjust the air influencing elements. It is also possible that the own printed circuit board 30 is implemented with a control unit to control the adjustment. The motor 6 starts working and drives, via the motor worm 16, the first input gear 101 of the input shaft drive element 10. As the second input gear 102 is connected with the first input gear 101, it is put in motion at the same time and at the same rotational speed. The second splitting gear 902 is coupled with the second input gear 102, and is thereby caused to rotate. The splitting pinion 901 is connected with the second splitting gear 902 and moves along with it, the first drive gears 111, 112 being thereby set in motion. Since the second drive gears 112, 122 are connected with the first drive gears 111, 112, they rotate along at the same rotational speed. The second drive gears 112, 122 are in engagement with the output gear 131 and therefore set the output shaft 5 in motion. A coupling element of the air influencing elements can be inserted at the end 5a, or 5b of the output shaft 5, in particular into the recess 13a or 13b—not shown—of the output shaft element 13. Here, the recess 13a, 13b is provided with a star-shaped cross section in order to couple the coupling element of the air influencing element nonrotatably with the output shaft element, and in this way to effect the adjustment of the adjusting element or the adjusting elements of the air influencing element.

In the embodiments of FIG. 1a, FIG. 1b, and FIG. 1c, the drive unit 1 is described and shown with a drive train 3 which comprises a single split part, of which the first drive path 7 of the split part comprises the first drive element 11 and the second drive path 8 of the split part comprises the second drive element 12. The first and second drive paths 7, 8, however, can also comprise several first and second drive elements, respectively. Also, the drive train can comprise more than one split part.

FIG. 2 shows a top plan view of a drive unit 1. In this example, no counting element is provided. An upper shell part 100a has been left out, and also a part of the printed circuit board 30 has been schematically removed so that the drive unit 1 is visible in the lower shell part 100b. The shell part 100b is provided with mounting eyes 100c through which a fastener can then be inserted to secure the housing 100, for instance to the motor vehicle. In this example, the shell parts 100a, 100b are welded together, but obviously a different way of connecting the shell parts 100a, 100b with each other is also possible, for instance a snap or clamped connection.

In this top plan view, it can be seen that the first axis B, the second axis C and the third axis D are parallel to each other and at a distance from each other. Also the input axis A and the output axis E are parallel and at a distance from the first, second and third axes B, C, D. Accordingly, the drive elements, which are rotatably disposed around the respective axes, are received in lying orientation in the housing 100, in consequence of which the drive element 1 can be implemented compactly in height. Also, the assembly of the shaft elements and of the drive elements in the housing can be simpler, since the drive elements can be arranged in lying orientation in the housing. This can also make automation of the assembly easier. For instance, the separate elements can be assembled from above in the lower shell part 100b.

The motor 6 is disposed in lying orientation in the housing, and obliquely with respect to a length direction of the drive unit, to achieve a drive unit that is as compact as possible. The output shaft of the motor 6 makes an angle of about 90 degrees with respect to the axis A of the input shaft 4.

In the top plan view, it can also be seen that the first axis B, the second axis C and the third axis D are in an isosceles triangle configuration relative to each other. The triangle of the triangle configuration has three legs BC, BD and CD. The legs BD and CD are equally long, the splitting drive element 9 is in the middle between the first drive element 11 and the second drive element 12. Preferably, the isosceles triangle configuration is an obtuse triangle configuration. The angle between the legs CD and BD is an obtuse angle. By providing the angle at the third axis D as an obtuse angle, the distance between the third axis D and the leg BC is relatively short. The splitting drive element 9 is then relatively close to the axis B of the first drive element 11 and to the axis C of the second drive element 12.

The first drive element 11, the splitting drive element 9 and the second drive element 12 are in engagement with each other and experience forces thereof. The first drive element 11 exerts a force F11 on the splitting drive element 9 in the direction of the leg BD. The second drive element 12 exerts a force F12 on the splitting drive element 9 in the direction of the leg CD. FIG. 2a schematically shows the forces of the split drive train. Because the first drive element 11 and the second drive element 12 are in a line, viz. on the leg BC of the triangle BCD, the force components $F11y$ and $F12y$, of the forces F11, F12 of the first drive element 11 and the second drive element 12, respectively, cancel each other out along the line of the leg BC. Indeed, due to the splitting of the drive train 3 into a first drive path 7 and a second drive path 8, the forces F11, F12 on the first drive element 11 and the second drive element 12, respectively, are approximately equally large. These forces F11, F12 can be resolved into a component $F11y$, $F12y$ along the line of the leg BC and a component $F11x$, $F12x$ transverse to that line. The force components $F11y$, $F12y$ along the line of the leg BC cancel each other out, as a result of which the splitting drive element 9 in that direction experiences no force or hardly any force from the drive elements 11, 12. What is then left for both drive elements 11, 12 is a force component $F11x$, $F12x$ in the direction transverse to the direction of the leg BC. These force components $F11x$, $F12x$ add up and are experienced by the splitting drive element 9. By placing the splitting drive element 9 as closely as possible to the leg BC of the triangle, and thus making the distance to the leg BC as small as possible, the force component $F11x$, $F12x$ of the forces F11, F12 of the drive elements 11, 12 in the direction transverse to the leg BC is relatively small, and it can, even when added up, be relatively well absorbed by the splitting drive element 9, in particular by the pinion 901 with the evoloid toothing. This is because the input shaft drive element 10 also exerts a force on the splitting drive element 9, which largely cancels out the added-up force components $F11x$, $F12x$ of the drive elements 11, 12. Accordingly, the splitting drive element 9, and in particular the pinion with evoloid toothing 901, experiences relatively small forces, which allows it to be made relatively light, for instance manufactured from plastic. Preferably, the obtuse angle between the legs BD and CD is between about 150 degrees and about 175 degrees.

Optimally, the axes B, C and D are in one plane, in a top plan view this shows as the axes B, C, D lying in one line, and they form an angle of 180 degrees with each other, viewed in a direction along the axes. In that case the triangle has no height anymore, but has become a line. In such an optimal situation the force that the drive element with evoloid toothing 9 experiences, resulting from the first and second drive elements 11, 12, is wholly or practically nil.

FIG. 3 shows schematically a part of the motor 6, with the motor worm 16 on an output shaft pin 61 of the motor 6. The output shaft pin 61 is caused to rotate by the motor 6, and transmits this rotation to the motor worm 16 and hence to the drive train 3. The motor worm 16 is rotation-locked with the shaft pin 61 in that a free end 61a of the shaft pin 61 is provided with at least one flattened side. In this example the free end 61a is provided with two flattened sides, which form opposite sides of the free end 61a. The motor worm 16 is provided on an inner side thereof with a corresponding recess 16b which cooperates with the shape of the shaft pin 61, to thereby achieve the rotation locking. Via this rotation locking, the motor torque can be transmitted to the motor worm 16 to set the drive train 3 in motion. The rotation locking of the motor worm 16 on the output shaft pin 61 of the motor 6 is thus achieved by a form-closed cooperation between the shaft pin 61 and the inner side of the motor worm 16. In axial direction, however, the motor worm 16 can still move over the shaft pin 61. In the recess 16b of the motor worm 16 a locating pilot element may be provided, for instance in the form of a spiral rib or groove. Owing to the pilot element the motor worm 16 can more easily be brought into the proper position relative to the flattened sides 61a of the shaft pin 61, which is favorable for automatic assembly. Also, by such a pilot rib or groove a proper locking of the motor worm 16 on the shaft pin 61 can be obtained, since the motor worm 16 is thereby brought into the proper position on the shaft pin 61.

The locking in axial direction of the motor worm 16 relative to the shaft pin 61 is achieved by retaining the motor worm 16, in axial direction, in the housing. To this end, the motor worm 16 may be provided at an end 16a thereof with a protrusion 16a which is receivable in a corresponding recess 116 of the housing 100, and can rotate therein, as shown in FIG. 4. Optionally, in the recess 116 of the housing, a small plate may be provided on which the end 16a can rotate, to thereby avoid plastic on plastic contact between the plastic motor worm 16 and the plastic housing 100. On another side of the motor worm 16, being the side proximal to the motor 6, a small metal bearing plate 17 is provided to retain the motor worm 16 axially. On this side, the motor worm 16 is thus bearing-supported on the bearing plate 17. An end of the motor worm 16 comprises for instance a ring-shaped edge which runs on the bearing plate 17 and thus provides the bearing, as well as the axial retention. The bearing plate 17 is so designed in shape, for instance rounded at the bottom and with flattened sides, that it fits into a corresponding recess 117 of the housing 100, whereby the bearing plate 17 is fixed with respect to the housing 100. Because the design of the bearing plate 17 at an upper end thereof, here provided with a bent end, and at a lower end thereof, here rounded, is different, the bearing plate can be unequivocally oriented and assembled in an automatic assembly line. Provision of this bearing plate 17 between the motor worm 16 and the motor 6 can also hinder or reduce bearing grease of the motor worm ending up in the motor. The bearing plate 17 also takes care, in part, of a closing off of the motor 6, for instance against bearing grease and/or against dirt. Optionally, between the motor 6 and the bearing plate 17 a spring may be provided which presses the bearing plate 17 against the motor worm 16 and so, by its end 16a, against the housing 100, to determine the axial position of the motor worm 16, and to counteract any ticking sounds due to the axial positioning of the motor worm relative to the housing, for instance at start-up of the motor 6. The bearing plate 17 is provided with an opening through which the shaft pin 61 can be inserted.

FIG. 5 shows an alternative to the axial bearing of the motor worm 16 in the housing 100, and FIG. 6 shows a perspective view of it. Here, two bearing plates 17 and 18 are used, each at an end of the motor worm 16. The bearing plates 17, 18 are received in corresponding recesses 117, 118 in the housing, and are thus fixedly received in the housing 100. Between the bearing plates 17 and 18, thus a chamber can be formed in which the grease of the drive train and/or the motor worm can remain. The bearing plates 17, 18 thus prevent the grease being able to penetrate into the motor 6, which is unfavorable to the bearings of the motor and has a negative influence on the life span of the motor 6. The bearing plate 17 is provided with an opening for the shaft pin 61, the bearing plate 18 has no such opening. An end 61 of the motor worm 61 is here provided with a ring-shaped edge which abuts against the bearing plate 18 and rotates over the bearing plate 18, since the bearing plate 18 is nonrotatably received in the housing, more specifically in a recess 118 of the housing 100. The bearing plates 17, 18 here also have a design that corresponds to the shape of the bearing plate 17 shown in FIG. 3 and FIG. 4. Preferably, an upper and a lower side of the bearing plates 17, 18 are different, which facilitates automated orienting and assembling. The sides are advantageously flattened so as to readily fit into the corresponding recesses 117, 118. In the example of FIG. 5, the motor worm 16 has no protruding end anymore. The bearing plates 17, 18 are preferably of metal, and can optionally be coated. By providing the bearing plates 17, 18 with metal, they can also function as heat dissipation for the heat that develops during use on the motor worm 16 and the motor 6. Also, the bearing plates 17, 18 may be coated, for instance to provide sound damping, cooling, lower friction. By now providing a second bearing plate 18, between the first bearing plate 17 and the second bearing plate 18 a chamber can be formed in which the bearing grease can be contained, and which is screened from the motor 6, so that the bearing grease cannot end up in the motor 6. In this example too, optionally, provision may be made for a small spring to determine the axial position of the motor worm 16 more accurately, and to counteract any ticking noises of the motor worm with respect to the housing, for instance during actuation of the motor 6. The spring may for instance be arranged between the motor 6 and the bearing plate 17.

The engagement between the first input gear 101 and the motor worm 16 is preferably of self-locking design, so that reverse rotation of the motor 6, when it is not active, can be prevented mechanically, by the self-locking feature. Optionally, also frictional differences in the direction of rotation may be introduced on the motor worm 16, for instance by use of two different materials of for instance the bearing plates 17, 18 or by using two different radii on the motor worm 16. Thus, a difference in friction is experienced when the motor worm rotates in one direction, or rotates in the other. From this difference, which can be detected in the power consumption, it can be determined in which direction the motor 6 is rotating. Also backdriveability of the drive train—that is, when the drive train is caused to move at the output shaft, and hence not, as in a normal operation, by the motor—may thus be made dependent on the direction of the load on the output shaft. For instance in the case of manual adjustment, when the adjusting element is moved by hand, it may be useful when the drive train is backdriveable. For the drive train to be backdriveable in a particular direction, it cannot be self-locking in that direction. For instance, it may be opted for to have the drive train backdriveable in one direction, but not in the other direction. In such an example, the user can then grasp the adjusting element and adjust it in the one direction, but not in the other direction. The back-driveability of the drive train in a particular direction can be obtained by friction in the drive train when it is loaded in the one direction, and will thereby block and is self-locking, but, conversely, a high efficiency in the other direction, whereby it is not self-locking, and so backdriveable in that direction. The friction mentioned can be obtained by, among other options, a difference in materials, or a difference in radii between drive elements. For instance, the friction between motor worm and bearing plate can be higher in one direction of rotation than in the other direction of rotation. FIGS. 7 and 8 show a cross section through the output shaft 5. In FIG. 7 the output shaft 5 is open at both ends, with a partition 5c in-between, and may be coupled at both ends 5a, 5b with a coupling element of an adjustable element. Thus, with one drive unit two adjustable elements can be adjusted simultaneously. Alternatively, a long continuous recess may be provided, without partition 5c, in the output shaft element 13, in which then a continuous shaft can be received which on both sides couples the adjustable elements. In FIG. 8 one end 5a of the output shaft 5 is closed with a cover 500, and the end 5b can be coupled with the air stream influencing element. The cover 500 can be a plastic part, and is provided with a skirt 501 and a shoulder 502 to close off the end 5a hermetically from dirt and ambient influences. The plastic cover 500 may be clamped in the housing. In this manner, with a single part a hermetic closure can be achieved, in consequence of which a closing ring, for instance a metal closing ring, can be omitted, which brings a saving of costs. When just one end 5b is used, the other end 5a can be hermetically closed off by the cover 500 and the partition 5c. A ring-shaped collar 510 and a retaining ring 512, explained below, can therefore be omitted, in consequence of which only just one part is needed, instead of two parts, which brings a saving of costs in the case where just one end of the output shaft 5 is used.

The end 5b of the output shaft element 13 is retained in the housing 100, in particular in shell part 100b of the housing 100, with a ring-shaped collar 510, of which a bevel edge 511 is biased towards a protruding position, and thus takes care of sealing of the output shaft element 13 with the housing 100b. The ring-shaped collar 510 can be a rubber sealing ring. This is shown in FIG. 7 and FIG. 8. A retaining ring 512 can be used to fix the ring-shaped collar 510 relative to the shell part 100b of the housing 100. In this manner, a closing ring, for instance a metal closing ring, can be omitted, which brings a saving of costs. The retaining ring 512 is preferably a plastic ring 512 which is co-welded to the housing. In the case where the other end 5a of the output shaft 5 is also used, as in FIG. 7, at that end 5a a same retaining and sealing can be provided with the ring-shaped collar 510 and the retaining ring 512.

In the foregoing, the invention has been explained on the basis of a drive unit for an adjusting element such as an air stream influencing element for a motor vehicle. However, the drive unit can also be used for other adjustable elements where space for placing the drive unit is only limited. The plastic motor worm 16, the bearing thereof in the housing through bearing plates 17, 18, the closing cover 500, the ring-shaped collar 510 and the retaining ring 512 can be regarded as inventions in themselves, for use in a drive unit for an adjusting element, independently of the construction of the drive train.

For the purpose of clarity and a concise description, features have herein been described as part of the same or different embodiments, but it will be clear that the scope of protection of the invention can comprise embodiments with combinations of all or some of the features described. It will be understood that the embodiments shown have the same or similar components, apart from where they are described as different.

In the claims, reference signs placed in parentheses shall not be taken as limiting for the claim. The word 'comprising' does not preclude the presence of other features or steps than those specified in a claim. Further, the words 'a(n)' and 'one' should not be taken as limiting to 'only one', but instead are used to indicate 'at least one', and do not preclude plurality. The mere fact that certain measures are recited in mutually different claims does not mean that a combination of these features cannot be used to advantage. Many variants will be clear to the skilled person. All variants are understood to be comprised within the scope of protection of the invention as defined in the following claims.

The invention claimed is:

1. A drive unit for adjusting an adjustable element between at least a first position and a second position, comprising a drive train having an input shaft and an output shaft, wherein the drive train is split into at least a first drive path and a second drive path, wherein a splitting drive element is at a split between the first drive path and the second drive path, and wherein the splitting drive element is a pinion with evoloid toothing,
   wherein the first drive path comprises at least one first drive element and the second drive path comprises at least one second drive element, of which one of the at least one first drive element and one of the at least one second drive element are both in engagement with the splitting drive element
   wherein the at least one first drive element, which is in engagement with the splitting drive element, is around a first axis, the at least one second drive element, which is in engagement with the splitting drive element, is around a second axis, and the splitting drive element is around a third axis,
   wherein the input shaft is around a fourth axis, which is parallel with the first axis and the second axis, and
   wherein the drive unit further comprises a motor, wherein an output shaft of the motor is transverse to the fourth axis, and wherein the input shaft comprises an input drive element which is in engagement with a motor worm of the motor.

2. The drive unit according to claim 1, wherein one of the at least one first drive element and one of the at least one second drive element are both in engagement with the output shaft for driving the output shaft.

3. The drive unit according to claim 1, wherein the first axis, the second axis and the third axis extend parallel relative to each other.

4. The drive unit according to claim 1, wherein the first axis, the second axis and the third axis are in an isosceles triangle configuration relative to each other viewed in the direction of the axes, in particular in an obtuse triangle configuration relative to each other, wherein the angle at the third axis is an obtuse angle.

5. The drive unit according to claim 4, wherein the angle at the third axis is between 150 degrees and 180 degrees.

6. The drive unit according to claim 1, wherein the first axis, the second axis and the third axis are in one plane.

7. The drive unit according to claim 1, wherein the motor worm is a plastic motor worm which is axially bearing-mounted in a housing of the drive unit and is axially movable relative to an output shaft of the motor.

8. The drive unit according to claim 1, wherein the motor worm is rotation-locked with the output shaft of the motor.

9. The drive unit according to claim 1, wherein at least one end of the motor worm is axially bearing-mounted on a bearing plate, wherein the bearing plate is borne by the housing of the drive unit.

10. The drive unit according to claim 1, further comprising a counting element in the drive train, for determining the position of a drive element in the drive train.

11. The drive unit according to claim 1, wherein the drive train further comprises a next split part, in which the drive train is split into at least two drive paths.

12. The drive unit according to claim 1, wherein an end of the output shaft element through a plastic collar is sealable with the housing, for receiving a coupling element for coupling with an adjustable element.

13. The drive unit according to claim 12, wherein the plastic collar is securable to the housing through a plastic ring which is welded to the housing.

14. The drive unit according to claim 1, wherein an end of the output shaft element is closable with a cover.

15. An adjustable element provided with at least one drive unit for the driving thereof according to claim 1.

16. An air stream influencing element for a motor vehicle provided with at least one drive unit for the driving thereof according to claim 1.

17. A method for adjusting an adjustable element or an air stream influencing element with a drive unit according to claim 1.

18. A motor vehicle provided with an air stream influencing element with a drive unit according to claim 1.

19. The drive unit according to claim 1, wherein the motor is disposed obliquely with respect to a length direction of the drive unit.

* * * * *